H. DENIS.
VALVE GRINDER.
APPLICATION FILED AUG. 30, 1921.
1,437,293.
Patented Nov. 28, 1922.
2 SHEETS—SHEET 2.
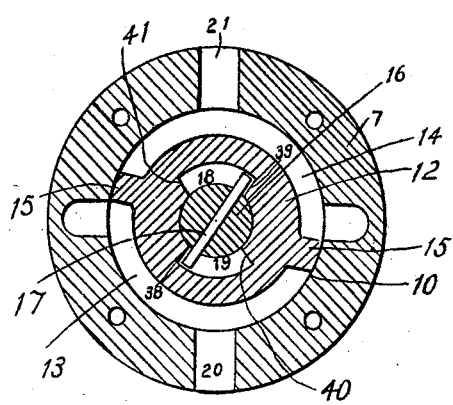
Fig-3-
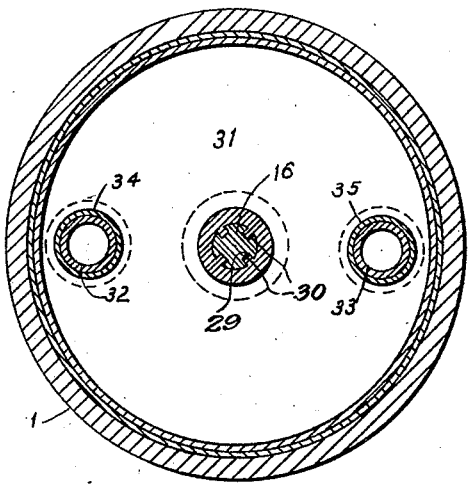
Fig-4-
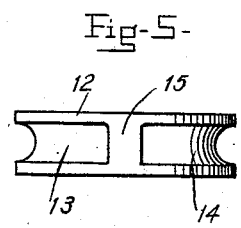
Fig-5-
Witnesses
Inventor
Henry Denis
By Victor J. Evans
Attorney Patented Nov. 28, 1922.

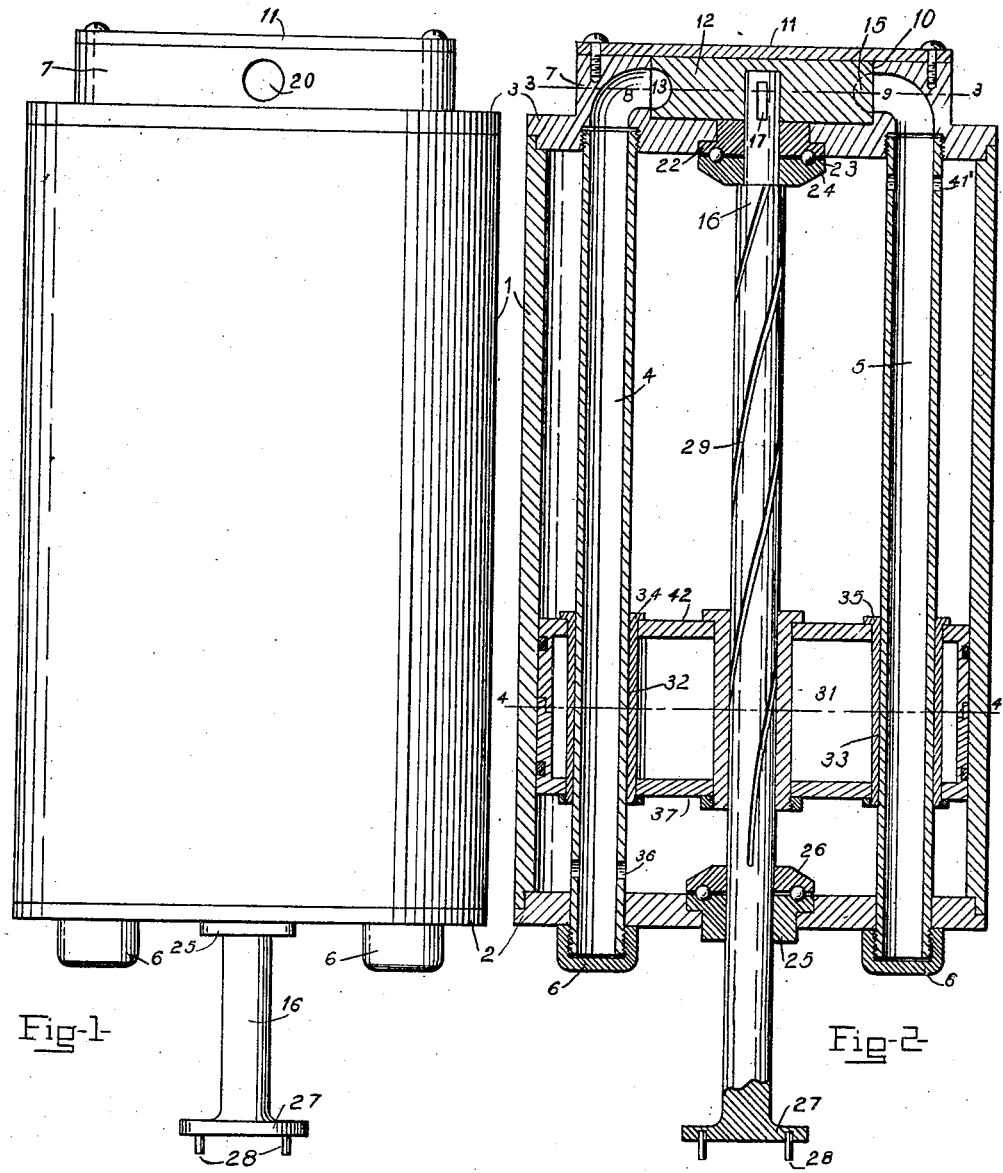

1,437,293

UNITED STATES PATENT OFFICE.

HENRY DENIS, OF HAYDEN, ARIZONA.

VALVE GRINDER.

Application filed August 30, 1921. Serial No. 496,843.

*To all whom it may concern:*

Be it known that I, HENRY DENIS, a citizen of the United States, residing at Hayden, in the county of Gila and State of Arizona, have invented new and useful Improvements in Valve Grinders, of which the following is a specification.

The present invention has reference to a fluid operated tool and is especially in the nature of a tool for grinding the valves of engines.

The primary object of the invention is to produce a machine of this character in which the fluid acts on a piston to reciprocate the same and wherein the movement of the piston operates a shaft which is connected to the valve to be ground and which actuates a valve that controls the admission of the fluid to the piston whereby the piston is caused to move in both directions.

A further object is to produce a fluid operated tool, in the nature of a valve grinder in which a piston has a ribbed hub, the ribs of which being received in spiral grooves in a shaft which is removably connected to the valve to be ground, and the said shaft controlling the valve which regulates the admission of fluid to the piston, whereby such fluid will be delivered to the opposite faces of the piston and also whereby a rotary movement in both directions is imparted to the shaft.

The foregoing and other objects which will appear as the nature of the invention is better understood, may be accomplished by a construction, combination and operative association of parts, such as is disclosed by the drawings which accompany and which form part of this specification.

In the drawings:—

Figure 1 is an elevation of a tool in accordance with this invention.

Figure 2 is an approximately central vertical longitudinal sectional view therethrough.

Figure 3 is a transverse sectional view on the line 3—3 of Figure 2.

Figure 4 is a similar sectional view on the line 4—4 of Figure 2.

Figure 5 is an edge view of the valve.

Referring now to the drawings in detail, the numeral 1 designates a cylinder which has both ends closed by heads 2 and 3 respectively. If desired, the heads may be screwed into the cylinder, and each head is provided with registering pairs of openings one of which being threaded and in which is screwed one end of tubes 4 and 5 respectively. The opposite ends of the tubes are received in the non-threaded openings. The ends of the tubes 4 and 5 project through the head 2, but the said ends are closed by cap nuts 6 respectively which also contact with the outer face of the head.

The head 3 is centrally provided upon its outer face with an enlargement in the nature of an annular boss 7, and the openings in which the tubes 4 and 5 are received communicate with inwardly directed angle branches 8 and 9 respectively in the boss 7. The boss is centrally formed with an annular pocket 10 which, however, is closed by a cap plate 11, the said plate being bolted to the said boss.

In the pocket 10 there is a valve 12. The valve is round in plan, being of a size to be snugly received in the said pocket, and the said valve has its sides formed with depressions providing fluid passages 13 and 14 respectively, and the shoulders between the passages provide what I will term vanes 15. The valve is centrally formed with a round opening which receives therein one end of a shaft 16, the shaft passing through central openings in the heads 3 and 2. The shaft, at the end thereof which is received in the valve 12 is provided with a transverse element which may be in the nature of a pin 17, and the ends of the said pin are received in depressions 18 and 19 respectively in the valve 12 which communicates with the opening therein in which the shaft 16 is received. The opposed walls provided by the depressions or recesses 18 are arranged at an inward angle with respect to each other so that when the shaft is in one position, the opposed sides or faces of the pin will contact with the opposed end walls of the depressions or recesses 18 and 19 respectively, with the result that the turning of the shaft will cause the valve 12 to be also turned and the vanes 15 to be brought to close one of the ports, say 8 and open the other port 9 when fluid is admitted through the inlet port 20 in the boss 7 of the head 3. The outlet port for the fluid indicated by the numeral 21 is disposed diametrically opposite the inlet port 20, and both of these ports alternatively are in communication with the passages 13 and 14 of the valve 12.

The shaft 16, at the portion thereof which passes through the head 3 is received through a bushing 22 that is screwed in the said head, the said bushing having its inner face preferably flanged, the flange being seated in the head 3, and the said flange is provided with an annular depression forming a raceway for antifrictional balls 23, the said balls being also received in a raceway provided upon a thrust bearing 24 on the shaft 16. The portion of the shaft which passes through the head 2 is also received in a bushing 25 screwed or otherwise let through the head, and this bushing may, if desired, be provided with a raceway for anti-frictional elements that are also received in a similar raceway in a thrust bearing 26 on the shaft 16. The shaft 16 has its end which passes through the head 2 flanged, as at 27, the said flanges being provided with depending pins 28 to be received in slots or depressions in the valve to be ground.

The shaft 16, between the thrust bearings 24 and 26 is provided with spaced spiral grooves 29 respectively that receive therein ribs 30 respectively provided in the bore of a piston 31. The piston has round openings 32 and 33 respectively therethrough, the tube 4 passing through the opening 32 and the tube 5 passing through the opening 33. The openings 32 and 33 have arranged therein bushings 34 and 35 respectively which are in contact with the tubes 4 and 5, and the periphery of the piston 31 is provided with the usual piston rings which are in contact with the bore of the cylinder 1.

We will suppose the parts to be in the position illustrated in Figure 3 of the drawings. Fluid, from any desired source, is delivered through the port 20 and will be directed through the passage 13 into the port 8, one of the vanes 15 being brought to uncover the port 8 and the other vane 15 being brought to cover the port 9 with respect to the fluid inlet. The piston is near the bottom of the casing, and the fluid will pass through the tube 4 and find an outlet through ports 36 adjacent to the end of the piston opposite the head 2. Thus the fluid will act upon the face 37 of the piston and will move the same toward the head 3. The engagement of the ribs 30 in the grooves 39 of the shaft 16 will slowly rotate the shaft, and will turn the pin 17 to bring the same out of contact with the shoulders 38 and 39 which provide the end walls of the depressions 18 and 19 respectively to cause the said pin to contact with the opposite end walls 40 and 41 of the said depressions 19 and 18. The piston has not yet reached the limit of its stroke, and further turns the shaft 16 to cause the pins to move the valve 12 to bring the vanes to close the port 8 with respect to the fluid inlet 20 and to uncover the port 9 for the inflowing fluid. The fluid already in the cylinder will find an outlet through the ports 36, tube 4, port 8, passage 13 and the outlet port 21, while the inflowing fluid will flow through the port 9 into the tube 5 and find an outlet through ports 41 respectively adjacent to the end of the tube 5 nearest the head 3. The fluid will act upon the face 42 of the piston, moving the same in an opposite direction, and consequently turning the shaft 16 in a reverse direction.

This operation is continued as long as fluid is admitted into the port 20.

It is believed that the foregoing description, when taken in connection with the drawings will fully set forth the construction, operation and advantages of the improvement, it being obvious that either the ports 20 or 21 may be employed respectively as fluid inlet or fluid outlet ports and also that the nature of the invention is such as to render the same susceptible to minor changes in proportion, material employed and in such details of construction which depart from the description and showing but which fall within the scope of what is claimed.

Having described the invention, I claim:—

1. In a device of the class described, a cylinder, a piston movable therein, tubes in the cylinder passing through the piston, said cylinder having fluid admission ports communicating with the tubes and the respective tubes having fluid outlet ports adjacent their opposite ends, said cylinder having outlet ports between the fluid inlet ports, a shaft influenced by the piston for rotary movement in opposite directions, a valve having grooves communicating with the ports and vanes at the terminal of said grooves, and means between the valve and shaft for causing the latter to influence the former and control the fluid admission and outlet ports when the piston has reached the limit of its movement in both directions.

2. In a device of the class described, a cylinder, a piston movable therein, tubes in the cylinder passing through the piston, said cylinder having inlet ports communicating with the tubes and outlet ports disposed between the inlet ports, means for admitting fluid under pressure through the inlet ports, said tubes having outlet ports adjacent their respective opposite ends, a valve having grooves communicating with the ports and vanes between the grooves, said piston having a spirally ribbed bore, a shaft journaled in bearings at the ends of the cylinder and entering the valve and having a spirally grooved portion passing through the bore of the piston and receiving the ribs in said grooves, a finger on the end of the shaft received in the valve, and said valve having oppositely disposed depressions receiving therein the ends of the pin whereby said pin may contact with the end walls provided by the depressions to move the valve to control the ports when the shaft is influenced by the piston at the limit of the reciprocatory movement of the piston.

In testimony whereof I affix my signature.

HENRY DENIS.